United States Patent Office 3,419,139
Patented Dec. 31, 1968

3,419,139
APPARATUS FOR ANALYZING FRESH CONCRETE
Ralph Agthe, Nyon, Switzerland, assignor to Spindel-, Motoren- und Maschinenfabrik A.G., Uster, Zurich, Switzerland
Filed Apr. 28, 1965, Ser. No. 451,395
Claims priority, application Germany, Apr. 28, 1964, S 90,822
6 Claims. (Cl. 209—10)

ABSTRACT OF THE DISCLOSURE

Apparatus for carrying out a wet screen anlaysis of fresh concrete, by treating a mix of fresh concrete and washing liquid. A casing has a centrifugal spindle with driving means and a centrifuging cup is removably mounted in driving engagement with the spindle. A screen support holds a plurality of screens of different mesh size in superposed relationship as a pile above the centrifuging cup with the finest mesh screen forming the bottom screen. The mesh size of the different screens increases from the bottom screen towards the top screen. The screens are removable and means are provided for directing the effluent from the finest mesh screen into the centrifuging cup. The washing liquid overflowing from the centrifuging cup during rotation thereof is collected and vibrator means imparts vibratory motion to the screens on the screen support.

---

Actually, concrete used on a construction site is subjected to different controls or tests which can be divided in two groups.

(a) Testing of the ingredients before preparing the concrete, namely the cement, aggregates, water, additions, etc. According to the results of these tests, the required formula for the preparation of the concrete is established and the concrete mixer at the construction site is correspondingly adjusted.

(b) The tests performed with the completely set concrete, normally 28 days after pouring, generally comprise compressive and tensile strength tests, the volumetric weight determination and, if desired, the determination of the modulus of elasticity and further physical properties. The usual standards for determining the quality of concrete are principally based on the strength characteristics which can be ascertained 28 days after the pouring of the concrete.

The comparatively long period between the moment of casting of the concrete and the time of testing of the quality of the material, which is required owing to the setting time of the cement, results in substantial disadvantages. When, for example, one month after pouring a concrete structure it is ascertained, that certain structural parts have not attained the prescribed strength values, it is in most cases too late, in view of the actual speed of building, to consider breaking down the building structure.

Until now there did not exist any possibility of examining the quality of the fresh concrete as it is delivered by a concrete mixer. A short time ago, a method for analyzing fresh concrete has been developed by Conrad Zschokke Limited. This method allows the determination of the following components of the fresh concrete or mortar: (a) cement content, (b) water content, (c) granulometric analysis.

This method essentially consists in washing the concrete or mortar before having set by means of technical alcohol, and separating the finest ingredients (cement and stone power) contained in the washing liquid, preferably in a continuous centrifuge.

The principal object of the invention is the provision of apparatus for carrying into practice the above method. According to the invention such apparatus comprises a set of sieves or screens including a plurality of superposed screens of different mesh adapted to receive a sample of fresh concrete mixed with alcohol for washing out the finest solid particles, equipment arranged underneath the set of screens and including a centrifuge spindle, a centrifuge cup carried by the spindle adapted to receive the washing liquid flowing out of the set of screens and containing said finest particles of the sample, whereby centrifuging of the liquid collecting in said cup causes to separate said finest particles from the washing liquid and permits to determine the proportion of finest particles in the concrete sample, and vibrator means associated with said set of screens to impart vibratory movement to said screens during washing and sieving said concrete sample.

The invention will now be more fully described with reference to the accompanying drawings showing two embodiments of apparatus for carrying out the method of analyzing fresh concrete according to the invention.

Figure 1:
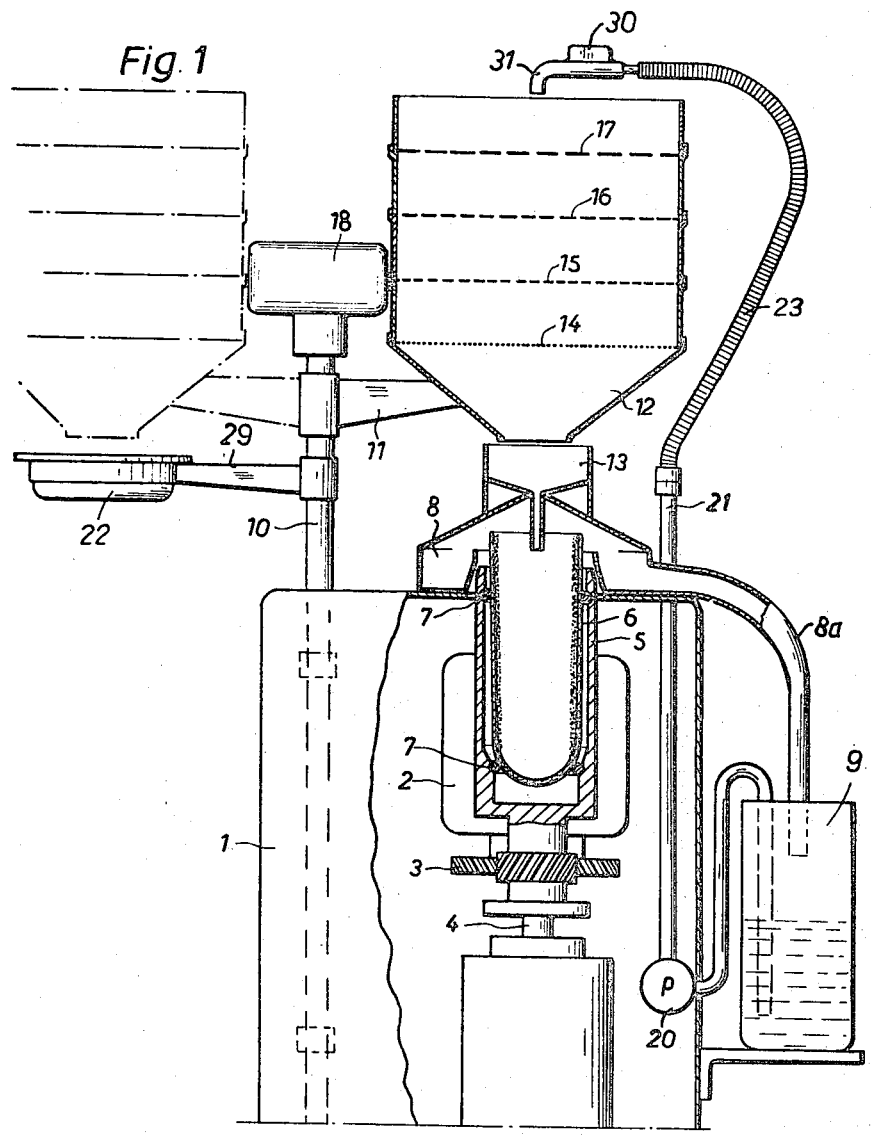
FIGURE 1 shows diagrammatically in vertical section a preferred embodiment of the apparatus.

Referring to FIG. 1, the apparatus shown comprises a continuous centrifuge having a casing 1 containing a motor 2 which drives by the intermediary of a gear 3 a centrifuge spindle 4, 5 which is rotatably mounted in the casing 1. The upper portion 5 of the centrifuge spindle carries a centrifuging cup 6 which is frictionally engaged in driver rings 7 so that it can be easily inserted into and withdrawn from the cylindrical spindle portion 5. The drive of the spindle could also be obtained by a belt transmission instead of by a gear as shown. The upper end of the centrifuging cup 6 opens into a collector 8 from which the liquid flowing out over the upper edge of the cup 6 is discharged through an outlet conduit 8a into a receiving vessel 9.

A supporting rod 10 secured to the casing 1 carries a rotatable arm 11 which supports a screen box 12. As shown, this screen box can be brought into a position above an inlet funnel 13 of the centrifuge, or turned from this position to that shown in dash and dot lines, clear of the centrifuge, in order to enable removing of the collector 8 and of the centrifuging cup 6.

The screen box 12 according to the example shown contains four superposed screens 14, 15, 16 and 17 of different mesh size. The lowermost screen 14 has for example a screen size of 0.075 mm. (6400 meshes per cm.$^2$) and the second sieve 15 has a mesh size 0.15 mm., while the two upper screens have larger mesh sizes in staggered sequence. According to requirements a smaller or greater number of screens may be employed.

The rod 10 also carries a vibrator 18 which is connected to the screen box 12. A vibration of the screen box is required during the screening operation in order to prevent a clogging of the lower fine mesh screens and to accelerate the washing of the aggregates. The rod 10 further carries an arm 29 supporting a collecting bowl 22 into which the dripping washing liquid may be received when the centrifuging cup is exchanged. The liquid collected in the bowl 22 is poured again into the screen box 12 on top of the uppermost screen.

The receiving vessel 9 is connected to a pump 20 of any desired type, in order to deliver the washing liquid for repeated use to the top of the screen box 12.

An analysis of fresh concrete by means of the described apparatus will be carried out in the following manner:

A sample is taken from the fresh concrete supplied by a concrete mixer. The greater is the maximum grain size of the aggregate used in preparing the concrete, the bigger shall be the testing sample.

The weight of the sample is to be exactly determined and then the sample is thoroughly mixed with an appropriate amount of alcohol, whereby the water combines with the alcohol and setting of the concrete is prevented. The mix of alcohol, water and concrete is then poured into the uppermost screen 17 of the screen box and washed by adding more alcohol. The smallest minute particles of the aggregates and the cement suspended in the washing liquid, which pass together with the liquid the 0.075 mesh screen, arrive in the inlet funnel 13 and flow into the centrifuging cup 6 where they separate owing to the centrifugal force. The practically clear mixture of alcohol and water is discharged over the upper edge of the cup 6 into the collector 8 and flows out through the conduit 8a into the vessel 9. This liquid mixture can be used again for washing and will be delivered by the pump 20 from the vessel 9 through the conduits 21 and 23 to the uppermost screen of the screen box 12. In this manner, a circulation of washing liquid is formed and is continued until all the aggregates of the sample are thoroughly washed and cleaned. The upper portion of the conduit 23 is flexible and is provided with a handle 30 near its outlet end 31, so that the operator of the apparatus can guide the outlet end 31 by hand over the entire surface of the screen 17 and direct the delivered spray of washing liquid over all the aggregates remaining on the top screen.

The washing of the aggregates is carried out from the top, one screen after the other being sprayed in succession. First, the coarser aggregates on the upper screens are washed. When the aggregates remaining on the top screen are washed out, this screen is removed and the aggregates in the next following screen are washed. The removed screens with the washed aggregates are brought into a drying furnace. The aggregates in the lower fine-mesh screens must be washed with particular care. The vibrator 18 acting upon the screen box 12 prevents the lower fine-mesh screen from becoming clogged and accelerates the washing operation.

The rotatable mounting of the screen box 12 on the carrying rod 10 enables an easy exchange of the centrifuging cup 6. Since the amounts of finest particles to be separated may be relatively large, it may happen that the analysis of one sample of concrete requires the use of more than one centrifuging cup 6. As soon as the cup 6 has collected a too large amount of certifuged residues, which fact can be observed owing to the alcohol-water mixture flowing out of the collector 8 becoming turbid, the washing process must be interrupted. The screen box 12 is then turned through about 180° into the position shown in dash and dot lines in FIG. 1, so that the funnel 13 and the collector 8 of the centrifuge can be lifted off the casing 1, permitting removal of the cup 6 and insertion of a fresh cup into the centrifuging spindle portion 5. The washing process can then be continued.

When the washing process of the aggregates on all screens is finished, which process may last about one half of an hour, the contents of the screens and the residues in the centrifuging cups 6 are dried and afterwards exactly weighed. Since the finest-mesh screen in the described example of the apparatus is a 0.075 mm. mesh screen, this weighing of the dried aggregates results in the determination of the dry weight of the solid ingredients of the concrete which are of greater size than 0.075 mm. and of the dry weight of the solid ingredients of the concrete which are of smaller size than 0.075 mm., and the difference between the sum of these two weights and the initial weight of the sample is equal to the water content of the tested concrete.

Now the dry screening of the aggregates has to be effected according to conventional methods. The proportion of finest particles which is obtained by such screening is to be added to the amount of the centrifuged residues and deducted from the weight of the solid ingredients of the size larger than 0.075 mm.

When the total weight of the concrete sample, the dry weight of the solid ingredients of the concrete of a size larger than 0.075 mm. and the dry weight of the solid particles of a size smaller than 0.075 mm. have been determined, the test which can be carried out by means of the described apparatus is terminated. From these determined values the water content and the cement content of the sample can be calculated. Also the sieve-analysis curve or grain size-curve of the aggregates can be determined by carrying out the described test.

Figure 2:
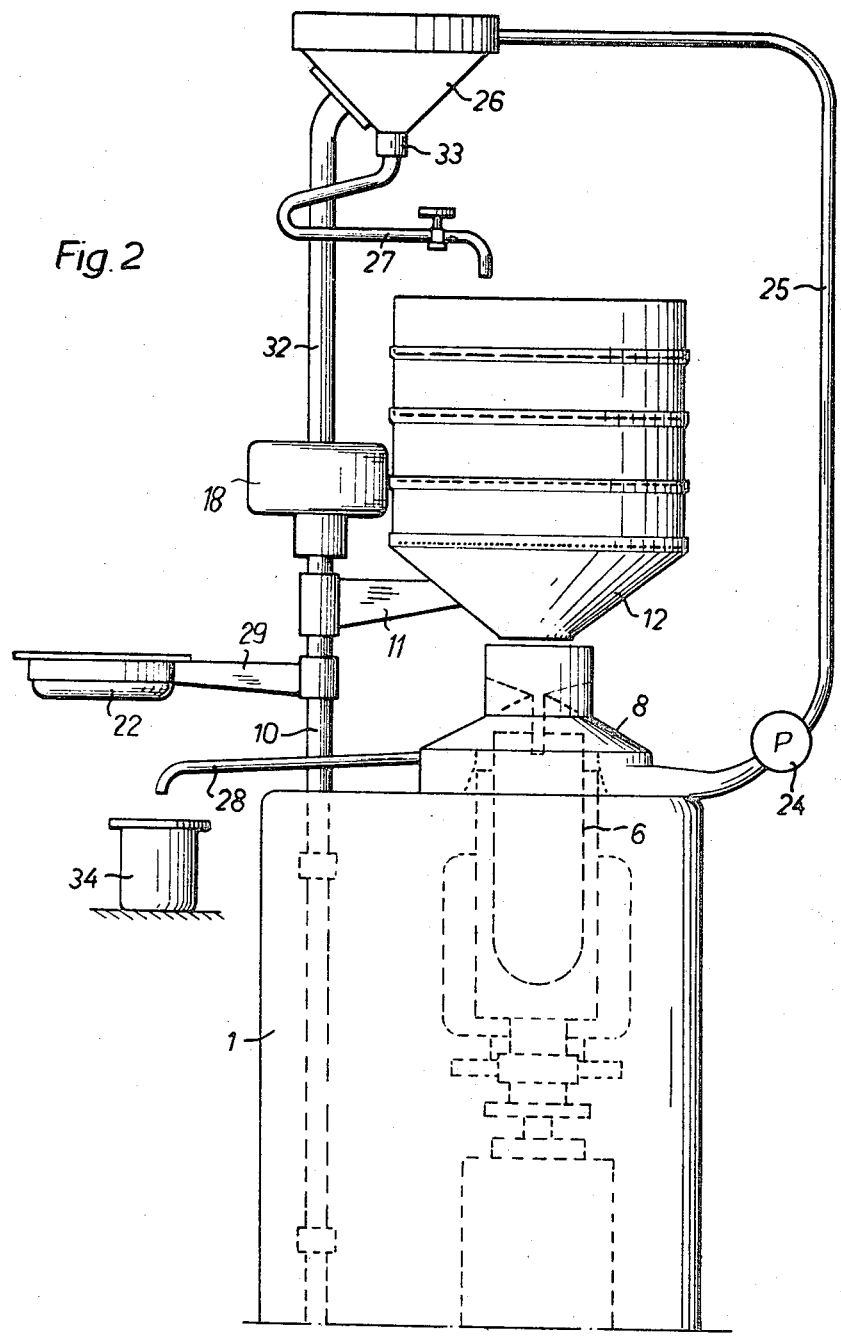
FIGURE 2 shows a modification in elevation.

FIG. 2 shows a modification of the testing apparatus. Instead of providing a receiving vessel 9 for the washing liquid flowing out of the collector 8, this latter is directly connected to a pump 24 which delivers the washing liquid flowing out of the centrifuging cup 6 by means of a conduit 25 to a receptacle 26 arranged above the screen box 12 carried by an extensive 32 of the carrying rod 10. A flexible conduit 27 is connected to the outlet 33 of the receptacle 26 permitting distribution of the washing liquid in the receptacle over the contents of the top screen in the screen box 12.

In this modification, it is necessary to connect an overflow pipe 28 to the collector 8, so that in case of trouble or break-down of the delivery of the centrifuged liquid by the pump 24 through the conduit 25, the liquid flowing out of the centrifuging cup 6 can be collected by means of a receiving vessel 34. The operation of this modified apparatus for carrying out the testing of a concrete sample is the same as described with reference to FIG. 1.

It will, of course, be understood that various details of construction may be varied through a wide range without departing from the principles of this invention and the scope of the appended claims.

I claim:

1. Apparatus for carrying out a wet screen analysis of fresh concrete, by treating a mix of fresh concrete and washing liquid, comprising a casing, a centrifugal spindle in said casing, driving means for said spindle, a centrifuging cup mounted in said casing, means for removably holding said centrifuging cup in driving engagement with said spindle, a screen support for holding a plurality of screens of different mesh size in superposed relationship as a pile above said centrifuging cup with the finest mesh screen forming the bottom screen, the mesh size of the different screens increasing from the bottom screen towards the top screen, said screens being removable one by one from the pile of screens, means for directing the effluent from said finest mesh screen into said centrifuging cup, means for collecting washing liquid overflowing from said centrifuging cup during rotation thereof, and vibrator means for imparting vibratory motion to said plurality of screens on the screen support.

2. Apparatus according to claim 1, in which said screen support is pivotally mounted above said centrifuging cup, so that it may be turned out of its operative position above said centrifuging cup to permit an easy exchange of the cup.

3. Apparatus according to claim 1, in which a supporting rod is mounted on said casing, said screen support being pivotally mounted on said rod, and said vibrator means being mounted on said rod movement with said screen support.

4. Apparatus according to claim 1, in which a vessel is provided for receiving the washing liquid discharged from said centrifuging cup and a pump is connected to said vessel for delivering the washing fluid to said screens.

5. Apparatus according to claim 1, wherein a collector receives the washing liquid flowing out of said centrifuging cup, a pump delivers the washing liquid from said collector to a receiving vessel disposed above said screen support for recycling the washing liquid through said screens into said collector.

6. Apparatus according to claim 5, in which said collector is provided with overflow means.

References Cited
UNITED STATES PATENTS

| | | | |
|---|---|---|---|
| 2,647,686 | 8/1953 | Drury | 233—27 |
| 2,849,113 | 8/1958 | Bourne | 209—12 |

FRANK W. LUTTER, *Primary Examiner.*

U.S. Cl. X.R.

290—2, 44, 237, 269, 319; 73—432